United States Patent [19]

Suginoya et al.

[11] Patent Number: 4,522,691

[45] Date of Patent: Jun. 11, 1985

[54] METHOD FOR MANUFACTURING A MULTICOLOR FILTER AND A MULTICOLOR DISPLAY DEVICE

[75] Inventors: Mitsuru Suginoya; Koji Iwasa; Hitoshi Kamamori; Yutaka Sano; Yumiko Terada, all of Tokyo, Japan

[73] Assignee: Seiko Instruments & Electronics Ltd., Tokyo, Japan

[21] Appl. No.: 563,947

[22] Filed: Dec. 21, 1983

[30] Foreign Application Priority Data

Dec. 22, 1982 [JP] Japan .................. 57-233933
Dec. 22, 1982 [JP] Japan .................. 57-233934
Apr. 12, 1983 [JP] Japan .................. 58-64117

[51] Int. Cl.³ ............... C25D 13/02; C25D 13/06
[52] U.S. Cl. ............................ 204/18.1; 204/20; 204/30; 204/38.4; 204/38.7; 204/40; 204/35.1; 204/37.6; 204/180.2; 204/181.1; 204/181.5; 204/181.7; 428/432; 428/461

[58] Field of Search .......... 204/18 R, 30, 20, 35 R, 204/35 N, 38 B, 38 E, 181 R, 181 C, 181 T, 181 N, 40; 428/432, 461

[56] References Cited

U.S. PATENT DOCUMENTS

| | | | |
|---|---|---|---|
| 3,681,223 | 8/1972 | Gupton | 204/181 N |
| 4,076,527 | 2/1978 | Nealy | 204/181 PE |
| 4,115,227 | 9/1978 | Hazan | 204/181 T |
| 4,130,472 | 12/1978 | Kaplan et al. | 204/181 N |
| 4,222,828 | 9/1980 | Zuurdeeg | 204/181 N |
| 4,278,579 | 7/1981 | Murphy | 204/181 C |

Primary Examiner—R. L. Andrews
Attorney, Agent, or Firm—Robert E. Burns; Emmanuel J. Lobato; Bruce L. Adams

[57] ABSTRACT

Multicolor filters are produced by forming a conductive thin film layer having a given pattern on a insulated substrate, and electrodepositing colored polymers on the conductive thin film layer.

50 Claims, 3 Drawing Figures

METHOD FOR MANUFACTURING A MULTICOLOR FILTER AND A MULTICOLOR DISPLAY DEVICE

BACKGROUND OF THE INVENTION

The present invention relates to method for manufacturing a multicolor filter by electrodeposition and a method for manufacturing a multicolor display device utilizing the multicolor filter.

Conventionally a monocolor filter which is colored by diffusing metal atoms into a glass substrate has been widely used for cameras. Recently a multicolor filter having fine patterns has been required for image camera tubes. The multicolor filter is made by printing the multicolor pattern on a glass substrate or by photolithography in which a colored layer is formed on a glass substrate and then the colored layer is exposed to ultra violet light through a mask to be etched in the desired pattern by the photolithographic method. Such a process is repeated for different colors so that a fine multicolor filter is obtained. Quite recently a multicolor display device comprised of a liquid crystal display device and the multicolor filter having a fine pattern has been developed. Hereinafter such a prior art multicolor display device is briefly explained.

FIG. 1 shows an embodiment of a prior art multicolor display device using a color filter. In FIG. 1, numeral 1 denotes a transparent substrate, 2 denotes a display electrode consisting of a transparent electroconductive film on which a figure or a letter is patterned, 3 denotes a color filter tightly formed on the surface of the display electrode 2, 4 denotes a transparent counter electrode, and 5 denotes a transparent counter substrate. A material serving as an optical shutter and comprised of liquid crystal or electrochromic material which has the property of being opened or closed by an applied voltage is filled between a space sandwiched by the two substrates 1 and 5. The color filters 3, 3' and 3'' are in different color tones. When a voltage is selectively applied between the display electrodes 2, 2' and 2'' and the counter electrode 4, a multicolor display is made.

A multicolor display using a color filter is highly effective for practical use because the method is simple, a free choice of color tones can be easily obtained, and it can be combined with various display materials and systems.

As understood above, the requirement for the multicolor filter having a fine pattern increases while the fabrication process has to be easy and to be accurate in fineness of the multicolor pattern. However the conventional printing method does not achieve enough fineness though it is a easy method to carry out. The other conventional photolithography method requires precise alignment of the mask during the exposure of the ultra violet light and is very complicated to carry out though it achieves high accuracy of the pattern.

SUMMARY OF THE INVENTION

It is an object of the present invention to provide a new method for easily manufacturing a multicolor filter having, highly accurate pattern.

It is another object of the present invention to form a pattern of an electrodeposit film on a substrate and then to electrodeposit polymer on the patterned electroconductive film while making the electroconductive film the electrode for forming a colored layer.

According to the present invention, the electroconductive film is patterned in the desired pattern and with desired fineness by evaporation, spattering or etching with a mask. After this, the polymer is selectively deposited on the electroconductive film to which the voltage is selectively applied. Thus there is no need for any alignment process when forming the colored layer. In addition, the color filter according to the present invention is combined with a display device so that the electrode for the electrodeposition is also used as the display electrode of the display device. Since the substrate used for this method requires only the insulation characteristic on the surface thereof, the material and shape thereof is not restricted so that an electroconductive thin film layer with excellent fitness to the substrate can be selected.

DETAILED DESCRIPTION OF THE INVENTION

Figure 1:
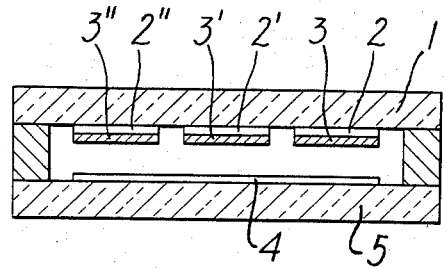
FIG. 1 is an embodiment of a conventional multicolor display device using a color filter.

Hereinafter a method for forming a colored layer by electrodeposition of polymers, which is an important aspect of the present invention, will be described. One of the methods for electrodepositing polymers on an electrode is a method for polymerizing a monomer on an electrode electrochemically. It has been reported that a polymer coating has been obtained by polymerizing various vinyl compounds on an iron plate electrochemically ("Metal surface Technology" Vol. 19, No. 12, 1968). Recently, researches on producing an electroconductive polymer such as poly (2,5-pyrrole) or poly (2,5-thienyline) by electrochemically polymerizing pyrrole or thiophene on an electrode have been actively made. The above method for electrochemically polymerizing a monomer directly, however, has drawbacks; namely it is still inefficient and lacks the option of selecting the desired coloration since the obtained film is already colored. Another method for electrodepositing a polymer is to insolubilize polymer from a polymer solution on an electrode to which a voltage is applied. By way of example, an electrodeposition coating method has been known in industrial fields, in which a colored layer is electrodeposited on a metal which serves as an electrode by being immersed in a polymer solution in which a pigment is scattered. Such an electrodeposition coating method is used for precoating an automobile body, etc. The principle of this method is as follows: a hydrophilic group such as a carboxyl group is introduced to a polymer; the carboxyl group is neutralized and solubilized with inorganic alkali, organic amine or the like; when an electrode is immersed in the solubilized polymer solution and a voltage is applied, a carboxyl-anion dissociated in the solution is electrophoresed toward a positive electrode and reacts upon a proton produced by an electrolysis of water on the electrode; and a polymer is insolubilized and deposited. Namely the reaction of the following equation is shown on the positive electrode and a polymer is deposited.

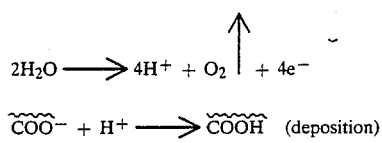

$$2H_2O \longrightarrow 4H^+ + O_2 \uparrow + 4e^-$$

$$\widetilde{COO^-} + H^+ \longrightarrow \widetilde{COOH} \quad \text{(deposition)}$$

Reversely, when a basic group (e.g. poly-amine) is used for a hydrophilic group to be neutralized and solubilized by acid, a polymer is deposited on the negative electrode. In case the electrodeposited polymer has an electrically insulating characteristic, the electrodes are coated with polymer and a current is reduced, whereby an increase in the film thickness would not be expected to prevent the electrodes from being coated with polymer any more. Actually, however, the complete coating of polymer can be prevented by bubbles of oxide evolved by the electrolysis of water, and some film thickness is obtained. Such a polymer film contains less water due to the effect of electroendosmosis and has an uniform thickness.

As a polymer for such electrodeposition, an addition compound of natural drying oil with maleic acid, an alkyd resin incorporation carboxyl group, an addition compound of epoxy-resin with maleic acid, a polybutadiene resin incorporation carboxyl group, a copolymer of acrylic acid or methacrylic acid with its ester, or the like can be used. Other polymers of organic compounds having other functional groups may be sometimes incorporated into a polymer structure according to the feature of the electrodeposition coating. These polymers are selectively used according to the desired characteristic of the colored layer. For example, if a transparent colored layer is required, an acrylic polymer or polyester polymer is preferably selected.

Methods for manufacturing electrodeposition polymers vary according to the sorts of polymers. For example, the manufacture of acrylic polymers is made by a radical copolymerization of acrylic acid or methacrylic acid having a carboxyl group with acrylic acid ester or methacrylic acid ester having a neutral group. In this case, the ratio of the carboxyl group to the neutral group is important: if the mount of the carboxyl group is too large, the insolubilization of the electrodeposited polymers is insufficient, and if it is too small, the solubility in case of neutralization becomes insufficient. An OH group can be incorporated in order to increase the solubility. After the decision of the composition of monomer, the polymerization is usually made, using a normal radical polymerizing agent, in hydrophilic solvent such as isopropyl alcohol, n-butyl alcohol, tert-butyl alcohol, methyl cellosolve, ethyl cellosolve, isopropyl cellosolve, butyl cellosolve, diethylene glycol methyl ether, diethylene glycol ethyl ether, or diacetone alcohol.

The polymer film obtained by electrodeposition can not be used by itself as a colored layer, and it must be colored. In general it is colored using a polymer solution in which a pigment is dispersed. The usable pigments are titanium oxide, barium sulfate, talc, asbestin, china clay, red iron oxide, yellow iron oxide, strontium chromate, basic silicide lead chromate, phthalocyanine blue, phthalocyanine green, hansa yellow, carbon black, etc. Such a pigment is charged with electricity in an aqueous solution of polymer and absorbs the polymer on the surface. And it is electrophoresed together with the polymer and co-electrodeposited with the polymer as the electrodeposited film.

Such a pigment generally decreases the transparency of the colored layer. However some pigments especially organic pigments do not decrease the transparency of the colored layer.

Otherwise dye can be used for improving the transparency of the colored layer. For electrodepositing the dye with the polymer, dye molecules should be electrified and electrophoresed. In case of soluble dye, a dissociated dye ion serves as a current medium and followed by increases in current and film thickness and the non-uniformity of the film. Although insoluble dyes ordinarily coagulate in a water, the electrodeposition polymer is regarded as a kind of soap having hydrophobic group and hydrophilic group which disperse to some extent against organic dye molecules and can be fined down into powder by being combined with a suitable disperse solvent and can be electrodeposited together with polymer. In this case, the electrodeposition velocities of the dye and the polymer that should be the same degree can be controlled by the composition of solution.

In turn water-soluble dye is utilized for making a colored layer by dyeing a polymer layer after electrodeposition as shown in the following embodiment. First, a transparent electroconductive film of tin oxide, indium oxide or the like is formed on a glass substrate by spray coating, spattering, etc. and then the film obtained is patterned by chemical or dry etching. The portions of the pattern of the transparent electroconductive film to be identically colored are selected and, as the anodes, electrodeposited by polymer in a neutralized aqueous solution of copolymer of acrylic acid or methacrylic acid with its ester. The electrodeposited electrodes are washed, cured and dyed by a cation dye for acrylic resin, for example, Aizen Cathilon, Diacryl, Sumiacryl, Astrazon, Basacryl, Deorene, Maxilon, Sevron etc. (Manual of Dyes). By repeating the operation above-mentioned, a colored pattern with excellent transparency can be formed on the glass substrate. If another transparent polymer is used, a selection of a dye suitable for the polymer used can show the similar effect. For instance, when polyester is used, a disperse dye is effective.

PREFERRED EMBODIMENT

Hereinafter the method for manufacturing the multicolor filter according to the present invention and the method for manufacturing the multicolor display device utilizing the multicolor filter are explained in detail in conjunction with preferred embodiments.

EMBODIMENT 1

Figure 2:
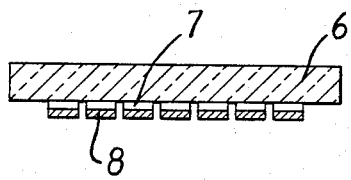
FIG. 2 is an embodiment of a multicolor filter according to the present invention and FIG. 3 is an embodiment of a multicolor display device made by the manufacturing method of the present invention.

FIG. 2 is an embodiment of a multicolor filter according to the present invention.

A method for manufacturing a multicolor filter as shown in FIG. 2 will be described in detail, hereinbelow.

(1) Patterning Process

Numeral 6 denotes a display substrate made of a transparent material, on which a tin oxide transparent electroconductive film is formed by a spray coating method. The transparent electroconductive film is patterned in the shape of stripes by etching to obtain display electrodes 7.

(2) Electrodeposition Process

The following is the composition of a coating S-Via ED-3000 (registered trademark; manufactured by Sinto Coating Co., Ltd. ):

| material | wt % |
| --- | --- |
| soluble polyester resin | 70 wt % |
| soluble melamine resin | |
| butylcellosolve | 30 wt % |
| ethylcellosolve | |
| n-butanol | |

The following is the composition of an electrodeposition bath using the S-Via ED-3000:

| material | wt % |
| --- | --- |
| S-Via ED-3000 | 5 |
| water | 120 |
| methylcellosolve | 15 |
| solvent dyes | x |

The solvent dye employed is a soluble hydrophilic solvent dye, and preferably of metal complex salt structure with extremely excellent light resistance. There is a solvent dye with the following molecular structure: (Name of product: Aizen Spilon, Oleosol Fast, etc. )

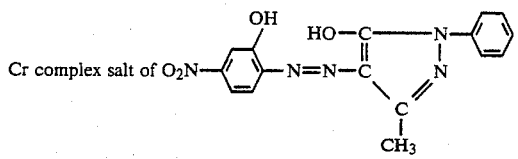

Color Index No.: Solvent Red 8

The order of forming the electrodeposition bath is as follows: S-Via ED-3000 is dissolved in water; a dye is dissolved in methylcellosolve; wt % "x" of the dye is freely chosen within a range not exceeding the solubility of the dye with respect to the methylcellosolve; the methylcellosolve in which the dye is dissolved is added to the aqueous solution; and the dye is uniformly dispersed. At this time, although the methylcellosolve serves as a disperse solvent, an increase in the amount of additives of the methylcellosolve or an increase in the number of carbons of alkyl group of the cellosolve causes an increase in the film thickness and the nonuniformity of the film.

The display substrate 6 on which the display electrodes 7 are formed is immersed in the electrodeposition bath made as illustrated above. Display electrodes to be colored identically are selected from the display electrodes 7 which are patterned in the shape of stripes. A 10 V voltage is applied for 3 minutes using the selected electrodes as the positive electrode. A large current flows immediately after the voltage application, and the current gradually reduces to approach almost zero. After the voltage application the display substrate 6 is extracted from the bath and washed down sufficiently to remove the solution deposited on the portions to which no voltage is applied. When the display substrate is dried after washing, a colored layer with excellent transparency is formed on the electrodes to which the voltage had been applied.

(3) Curing Process

A polyester resin and a melamine resin in the colored layer formed by electrodeposition are cured by a condensation reaction by heating. When the resins are cured in air at 175° for 30 minutes, the colored layer is completely cured. The film thickness of the colored layer on this occasion is 1.5 μm.

The cured colored layer is a complete insulation layer which is never electrodeposited or dyed even when again immersed and having a voltage applied thereto in the electrodeposition bath. Therefore, the second and third colored layers are formed by repeating the steps of: selecting other display electrodes to be colored identically again; electrodepositing the display electrodes in the electrodeposition bath in which dyes of different color tone are dispersed; and curing.

In this embodiment, stripe color filters 8 of 200 μm width in the order of red, blue and green are manufactured by the following extremely simple method: patterning process→electrodeposition process of a red filter→curing process→electrodeposition process of a blue filter→curing process→electrodeposition process of a green filter→curing process. The resultant color filter has no color shear, a good uniformity and a property of not being damaged by acid, alkaline, various kinds of organic solvents, nor hot water. The employed metal complex salt dye is extremely stable in the colored layer and has an excellent light resistance showing more than a 95% initial light resistance test in which a carbon arc is used as a light source. Such a fabricated multicolor filter is utilized for color image camera tube and for other uses.

EMBODIMENT 2

Figure 3:
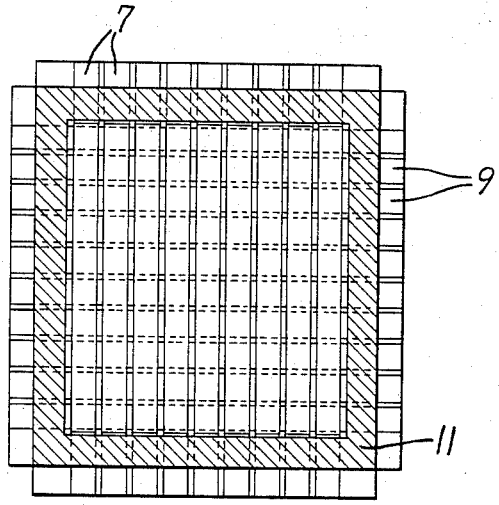
Figure 3:
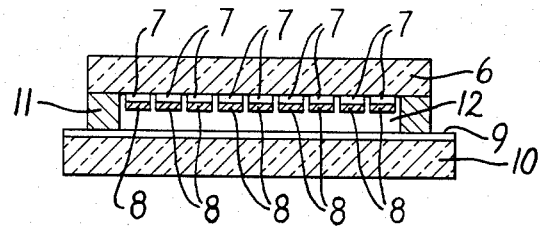

The multicolor filter as described in the Embodiment 1 is incorporated in a liquid crystal display device to constitute a multicolor display device. As shown in FIG. 3, the color filters 8 are formed on the display electrodes 7 according to the process described in the Embodiment 1. Plural transparent counter electrodes 9 are formed on the surface of a transparent counter substrate 10. The display substrate 6 is disposed oppositely to the counter substrate 10 with a spacer 11 interposed therebetween. At this time the display electrodes 7 face the counter electrodes 9 and the directions of the stripes of the two meet at right angles. A multicolor liquid crystal display device is made by filling a TN-FEM liquid crystal as a display material 12 in the cell. When a voltage is applied between the display electrodes 7 and the counter electrodes 9, and the cell is sandwiched between a polarizer and an analyzer whose transmission axes are parallel, the colors of the transparent color filters 8 are displayed by viewing from the display substrate 6 or the counter substrate 10. The cell is black when no voltage is applied. When a light is incident from the direction of the counter substrate 10, the colors or color tones of the color filter 8 are more vividly displayed owing to the excellent transparency of the cell. As illustrated, a method for manufacturing a multicolor display device of this embodiment realizes a color filter of fine patterns without loss of display quality notwithstanding its simplicity, whereby a color graphic display device driven by a matrix drive with high reliability is provided.

EMBODIMENT 3

A negative-type guest-host liquid crystal using black dichroism coloring matter serves as the display material 12 and a white material (white ceramic) serves as the display substrate 6 in this embodiment. A voltage is applied between the display electrodes 7 and the counter electrodes 9. Viewing from the direction of the transparent counter substrate 10 through the polarizing plate, the colors or color tones of the color filter 8 are clearly displayed. When no voltage is applied, the color of the dichromism coloring matter, black, is displayed. The Embodiment 3 shows the similar effects as the embodiment 2.

EMBODIMENT 4

A DSM liquid crystal serves as the display material 12 and aluminum is patterned in the display substrate 6 by the mask evaporation method to serve as the display electrodes 7 in this embodiment. A voltage is applied between the display electrodes 7 and the counter electrodes 9. Viewing from the direction of the transparent counter substrate 10, the DSM liquid crystal assumes a light scattering state, and the colors of the color filters 8 are displayed in a milk white. When no voltage is applied, the light scattering state disappears and the display is darkened. To place the DSM liquid crystal in the light scattering state efficiently, an ionic current to some extent should be flown. But the high resistance of the color filters 8 disturbs the ionic current to be flown. Accordingly, transparent electrodes whose patterns coincide with the patterns of the display electrodes 7 are provided on the color filters 8. The transparent electrodes serves as electrodes for applying the voltage, whereby a drive voltage is reduced and the effects similar to the Embodiment 2 is acquired.

EMBODIMENT 5

A coating of POWERMITE 3000-10 (trademark; manufactured by Nippon Paint Co., Ltd.) of the following composition is used for the electrodeposition bath in the Embodiment 1.

| material | wt % |
| --- | --- |
| soluble acrylic resin | 60 wt % |
| soluble melamine resin | |
| butylellosolve | 40 wt % |
| isopropyl alcohol | |

The following is the composition of the electrodeposition bath using the POWERMITE 3000-10:

| material | wt % |
| --- | --- |
| POWERMITE 3000-10 | 10 |
| water | 120 |
| ethyleneglycol | 20 |
| disperse dyes | x |

The disperse dyes which are available in the market to be used often contain an anionic disperse agent. Since the disperse agent changes into ions in the bath and causes the current value to be enlarged, it is desirable that the electrodeposition bath does not contain the disperse agent. The adjusting method for the electrodeposition bath: the disperse dyes are uniformly dispersed in ethyleneglycol within the range of x 1.5 and added to the solution in which the POWERMITE 3000-10 is dissolved in water. The disperse dye having the following structure can be used, for example.

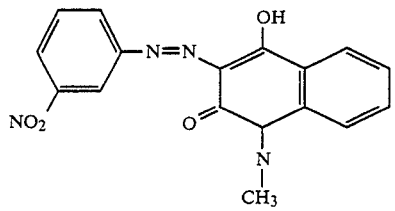

Color Index No.: Disperse Yellow 5

A multicolor liquid crystal display device in the Embodiment 5 exhibits similar effects to those of the Embodiment 2.

EMBODIMENT 6

The composition of the electrodeposition bath in the Embodiment 1 is changed as follows:

| material | wt % |
| --- | --- |
| S-Via ED-3000 | 20 |
| water | 120 |
| pigment | x |

The adjusting method for the bath: the pigment is added to the S-Via ED-3000 within the range of $x < 10$ and uniformly dispersed by the kneading method, ultrasonic wave method, etc. After that water is added to form the electrodeposition bath. Since the polymer in the electrodeposition bath is of high density, the colored layer is of 2.0 $\mu$m thick. The organic pigment such as phthalocyanine blue or phthalocyanine green is preferable because the pigment to be used is required to keep the transparency of the colored layer.

EMBODIMENT 7

The color filter 8 as described in the Embodiment 1 is fabricated according to the following process.

(1) Patterning Process

Numeral 6 denotes a display substrate made of a transparent material, on which a tin oxide transparent electroconductive film is formed by spray coating method. The transparent electroconductive film is patterned in the shape of stripe by etching to obtain display electrodes 7.

(2) Electrodeposition Process

The display substrate 6 on which the display electrodes 7 are formed is immersed in an electrodeposition bath made of an aqueous solution of 10 wt % of polyester-melamine resin coating (S-Via ED-3000: registered trademark; manufactured by Sinto Coating Co., Ltd). Display electrodes to be colored identically are selected from the display electrodes 7 which are patterned in the shape of stripes. A 10 to 100 V voltage is applied for a few minutes using the selected electrodes as the anode. After the voltage application the display substrate is extracted from the bath and washed. In washing the polymer deposited on the electrodes to which no voltage has been applied is washed down, but the polymer deposited on the electrodes to which a voltage has been applied can not be washed down because it is insoluble. When the display substrate is dried after washing, a polymer film with excellent transparency is formed on the electrodes to which a voltage is applied.

(3) Dyeing Process

In dyeing the polymer film, a cation dye is usable because the electrodeposited polymer has an acid carboxyl group. A disperse dye for polyester resin is also effective. The electrodeposition-processed display substrate is immersed in an aqueous solution of a cation dye (Diacryl: manufactured by Mitsubishi Kasei) of desired color tone to which acetic acid is added to obtain PH 3 to 5, and boiled until a desired color density is achieved. After the substrate is cooled and washed, the polymer deposited on the selected electrodes is dyed but the electrodes on which polymer is not deposited are not dyed.

(4) Dye Resistance Process

A melamine resin and carboxyl group in the polymer are cured by condensation reaction by curing. The cured polymer film is never dyed again, therefore, the second and third colored layers are formed by repeating the processes of: selecting other display electrodes to be colored identically again; electrodepositing; dyeing; and dye resistance processing. In this embodiment, color filters striped in the order of red, blue and green are manufactured by the following extremely simple method: patterning process→electrodeposition process of red filters→dyeing process of red filters→dye resistance process→electrodeposition process of blue filters→dyeing process of blue filters→dye resistance process→electrodeposition process of green filters→dyeing process of green filters→dye resistance process.

Next the multicolor display device is made as well as the Embodiment 2 so that the same effects as those in the Embodiment 2 are obtained.

EMBODIMENT 8

The display material 12 may comprise an aqueous solution of 0.3 mol/l KBr containing a benzyl viologen dibromide, in which titanium oxide powder is dispersed as a white background. When an electrochromic material is used as a display material, a large current flows at the time of displaying. So, transparent electrodes whose patterns coincide with the patterns of the display electrodes 7 must be provided on the color filters 8 and the transparent electrodes must serve as electrodes for applying a voltage. When the transparent electrodes on the color filters are at negative potential and the counter electrodes at positive potential, viewing from the direction of the display substrate 6, the mixed colors of the colors of the color filters 8 and the purple of the benzyl viologen radical are displayed on the white background. To the contrary, when the reverse potential is applied, the viologen radical disappears and the colors of the color filters 8 are only displayed. The effects similar to those of the Embodiment 2 can be obtained without any shear between the color of the viologen radical and the colors of the color filters 8.

What we claim is:

1. A method for manufacturing a color filter comprising the steps of: forming a conductive thin film layer having a given pattern on an electrically insulative substrate; and forming a colored layer on said conductive thin film layer by co-electrodepositing a coloring material and polymer on said conductive thin film layer.

2. A method for manufacturing a multicolor filter comprising the steps of: forming plural electroconductive layers electrically insulated from each other on a substrate; and forming colored layers of different colors on different ones of the electroconductive layers by successively co-electrodepositing coloring material and polymer on the electroconductive layers.

3. A method for manufacturing a multicolor filter as claimed in claim 2, wherein each of the colored layers is composed of a mixture of an electrodeposition polymer and a coloring material which are electrolytically deposited from a solution containing the electrodeposition polymer and the coloring material.

4. A method for manufacturing a multicolor filter as claimed in claim 3, in which said coloring material is water-insoluble.

5. A method for manufacturing a multicolor filter as claimed in claim 4, wherein said water-insoluble coloring material is selected from the group consisting of pigments, disperse dyes and solvent dyes.

6. A method for manufacturing a multicolor filter comprising the steps of: forming plural electroconductive layers electrically insulated from each other on a substrate; and forming colored layers of different colors on different ones of the electroconductive layers by electrodepositing a polymer layer on the electroconductive layers from a solution containing the electrodeposition polymer and thereafter dyeing the electrodeposited polymer layer in a solution containing a dye.

7. A method for manufacturing a multicolor filter as claimed in claim 6, wherein the electroconductive layers are transparent electroconductive layers comprised of tin oxide or indium oxide and the colored layers are anodically deposited on the transparent electroconductive layers from a solution including negatively charged polymer.

8. A method for manufacturing a multicolor filter as claimed in claim 7, wherein the negatively charged polymer is selected from the group consisting of polyester resin, acrylic resin, melamine resin and combinations thereof.

9. A method for manufacturing a multicolor filter comprising the steps of: forming a plurality of conductive films on a surface of a substrate; immersing said substrate in an electrodeposition bath solution containing polymer resin and a coloring material; applying a voltage to some of said plurality of conductive films so that said polymer resin together with said coloring material are electrodeposited on said selected conductive films to form a colored layer; immersing said substrate in another electrodeposition bath solution containing polymer resin and a different coloring material having different color tone; and applying a voltage to other ones of said plurality of conductive films other than those already selected so that said polymer resin together with said different coloring material are electrodeposited on said other conductive films to form a differently colored layer having a different color tone.

10. A method for manufacturing a multicolor filter comprising the steps of: forming a plurality of conductive films on surface of a substrate; immersing said substrate in an electrodeposition bath solution containing polymer resin; applying a voltage to some of said plurality of conductive films so that said polymer resin is electrodeposited on said selected conductive films; dyeing said polymer resin electrodeposited on said conductive film so as to color said electrodeposited polymer resin; electrodepositing said polymer resin to other ones of said plurality of conductive films other than those already electrodeposited and colored; and dyeing said polymer resin electrodeposited on said other conductive films so as to color in a different color tone said electrodeposited polymer resin.

11. A method for manufacturing a multicolor display device using a multicolor filter comprising the steps of:

forming a plurality of display electrodes on a first electrically insulative substrate; electrodepositing polymer together with differently colored coloring materials on said display electrodes to form a multicolor filter comprised of differently colored color filters on different groups of display electrodes; forming a counter electrode on a surface of a second substrate; forming a cavity by disposing the first and second substrates in opposed spaced-apart relation with the display electrodes oppositely facing the counter electrode; and filling a display material in the cavity between said first and second substrates.

12. A method for manufacturing a multicolor display device as claimed in claim 11, wherein said display material comprises twist nematic-field effect mode liquid crystal.

13. A method for manufacturing a multicolor display device as claimed in claim 11, wherein said display material comprises a negative-type guest-host liquid crystal.

14. A method for manufacturing a multicolor display device as claimed in claim 11, wherein said display material comprises a dynamic scattering mode liquid crystal.

15. A method for manufacturing a multicolor display device as claimed in claim 11, wherein said display material comprises an electrochromic material.

16. A method of manufacturing a multicolor display electrode filter comprising the steps of: forming a pattern of separate display electrode groups on the surface of a substrate; co-electrodepositing a coloring material of one color tone and polymer on one display electrode group to form thereon a color filter of one color tone; and successively repeating the co-electrodepositing step using coloring materials of different color tones to form color filters of different color tones on respective ones of the other display electrode groups such that each display electrode group has color filters of the same color tone which is different from the color tones of the other display electrode groups.

17. A method according to claim 16; including the step of curing each display electrode group after the color filter is formed thereon and before the next successive co-electrodepositing step is carried out.

18. A method according to claim 16; wherein the coloring material is water-insoluble.

19. A method according to claim 18; wherein the water-insoluble coloring material is selected from the group consisting of pigments, disperse dyes and solvent dyes.

20. A method according to claim 19; wherein the polymer is selected from the group consisting of polyester resin, acrylic resin, melamine resin and combinations thereof.

21. A method according to claim 16; wherein the polymer is selected from the group consisting of polyester resin, acrylic resin, melamine resin and combinations thereof.

22. A method according to claim 16; wherein the pattern of separate display electrode groups comprises a plurality of stripes arranged in repeating sets with each set comprised of one display electrode from each of the separate display electrode groups.

23. A method of manufacturing a multicolor display device comprising the steps of: providing first and second substrates; forming a pattern of separate display electrode groups on a major surface portion of the first substrate; co-electrodepositing a coloring material of one color tone and polymer on one display electrode group to form thereon a color filter of one color tone; successively repeating the co-electrodepositing step using coloring materials of different color tones to form color filters of different color tones on respective ones of the other display electrode groups such that each separate display electrode group has color filters of the same color tone which is different from the color tones of the other display electrode groups; forming a counter electrode pattern on a major surface portion of the second substrate; disposing the first and second substrates in opposed spaced-apart relation with the pattern of display electrodes oppositely facing the counter electrode pattern; and filling the space between the spaced apart substrates with a display material.

24. A method according to claim 23; including the step of curing each display electrode group after the color filter is formed thereon and before the next successive co-electrodepositing step is carried out.

25. A method according to claim 23; wherein the pattern of separate display electrode groups comprises a plurality of stripes arranged in repeating sets with each set comprised of one display electrode from each of the separate display electrode groups.

26. A method according to claim 23; wherein the coloring material is water-insoluble.

27. A method according to claim 26; wherein the water-insoluble coloring material is selected from the group consisting of pigments, disperse dyes and solvent dyes.

28. A method according to claim 26; wherein the polymer is selected from the group consisting of polyester resin, acrylic resin, melamine resin and combinations thereof.

29. A multicolor display electrode filter comprising: a substrate having opposed major surfaces; a pattern of separate display electrode groups formed on one major surface of the substrate; and separate groups of color filters of different color tones formed on respective ones of the display electrode groups such that each display electrode group has color filters of the same color tone which is different from the color tones of the other display electrode groups, the color filters comprising co-electrodeposited layers of a coloring material and polymer.

30. A multicolor display electrode filter according to claim 29; wherein the coloring material comprises a water-insoluble material.

31. A multicolor display electrode filter according to claim 30; wherein the water-insoluble coloring material is selected from the group consisting of pigments, disperse dyes and solvent dyes.

32. A multicolor display electrode filter according to claim 31; wherein the polymer is selected from the group consisting of polyester resin, acrylic resin, melamine resin and combinations thereof.

33. A multicolor display electrode filter according to claim 29; wherein the pattern of separate display electrode groups comprises a plurality of stripes arranged in repeating sets with each set comprised of one display electrode from each of the separate display electrode groups.

34. A multicolor display electrode filter according to claim 33; wherein the stripes have a width on the order of 200 $\mu$m.

35. A multicolor display electrode filter according to claim 29; wherein the color filters have a width on the order of 200 $\mu$m.

36. A multicolor display device comprising: first and second substrates disposed in spaced-apart opposed relation; a pattern of separate display electrode groups formed on the surface of the first substrate which faces the second substrate; separate groups of color filters of different color tones formed on respective ones of the display electrode groups such that each display electrode group has color filters of the same color tone which is different from the color tones of the other display electrode groups, the color filters comprising co-electrodeposited layers of a coloring material and polymer; a counter electrode pattern formed on the surface of the second substrate which faces the first substrate; and a display material disposed in the space between the spaced apart first and second substrates.

37. A multicolor display device according to claim 36; wherein the coloring material comprises a water-insoluble material.

38. A multicolor display device according to claim 37; wherein the water-insoluble coloring material is selected from the group consisting of pigments, disperse dyes and solvent dyes.

39. A multicolor display device according to claim 38; wherein the polymer is selected from the group consisting of polyester resin, acrylic resin, melamine resin and combinations thereof.

40. A multicolor display device according to claim 36; wherein the pattern of separate display electrode groups comprises a plurality of stripes arranged in repeating sets with each set comprised of one display electrode from each of the separate display electrode groups.

41. A multicolor display device according to claim 40; wherein the stripes have a width on the order of 200 μm.

42. A multicolor display device according to claim 36; wherein the color filters have a width on the order of 200 μm.

43. A multicolor display device according to claim 36; wherein said display material comprises twist nematic-field effect mode liquid crystal.

44. A multicolor display device according to claim 36; wherein said display material comprises a negative-type guest-host liquid crystal.

45. A multicolor display device according to claim 36; wherein said display material comprises a dynamic scattering mode liquid crystal.

46. A multicolor display device according to claim 36; wherein said display material comprises an electrochromic material.

47. A multicolor display electrode filter produced by the method of claim 16.

48. A multicolor display device produced by the method of claim 23.

49. A method for manufacturing a multicolor filter as claimed in claim 2, wherein the electroconductive layers are transparent electroconductive layers comprised of tin oxide or indium oxide and the colored layers are anodically deposited on the transparent electroconductive layers from a solution including negatively charged polymer.

50. A method for manufacturing a multicolor filter as claimed in claim 49; wherein the negatively charged polymer is selected from the group consisting of polyester resin, acrylic resin, melamine resin and combinations thereof.

* * * * *